United States Patent
Boufounos et al.

(10) Patent No.: US 9,261,592 B2
(45) Date of Patent: Feb. 16, 2016

(54) METHOD AND SYSTEM FOR THROUGH-THE-WALL IMAGING USING COMPRESSIVE SENSING AND MIMO ANTENNA ARRAYS

(71) Applicant: Mitsubishi Electric Research Laboratories, Inc., Cambridge, MA (US)

(72) Inventors: Petros Boufounos, Boston, MA (US); Li Li, Durham, NC (US); Dehong Liu, Lexington, MA (US); Hassan Mansour, Boston, MA (US); Zafer Sahinoglu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 195 days.

(21) Appl. No.: 14/153,686

(22) Filed: Jan. 13, 2014

(65) Prior Publication Data
US 2015/0198713 A1    Jul. 16, 2015

(51) Int. Cl.
*G01S 13/88* (2006.01)
*G01S 13/89* (2006.01)

(52) U.S. Cl.
CPC ............... *G01S 13/89* (2013.01); *G01S 13/887* (2013.01); *G01S 13/888* (2013.01)

(58) Field of Classification Search
CPC .......................... G01S 13/887; G01S 13/888
USPC ......................................................... 342/22
See application file for complete search history.

(56) References Cited

U.S. PATENT DOCUMENTS

| | | | |
|---|---|---|---|
| 7,280,068 B2* | 10/2007 | Lee | G01S 13/89 342/179 |
| 7,834,795 B1 | 11/2010 | Dudgeon et al. | |
| 2001/0035837 A1* | 11/2001 | Fullerton | G01S 7/003 342/28 |
| 2006/0214832 A1* | 9/2006 | Lee | G01S 13/89 342/22 |
| 2007/0139248 A1* | 6/2007 | Baharav | G01S 13/89 342/22 |
| 2008/0079625 A1* | 4/2008 | Weems | G01S 7/20 342/22 |
| 2009/0040099 A1* | 2/2009 | Young | G01S 7/4026 342/179 |
| 2010/0060509 A1 | 3/2010 | Chambers et al. | |
| 2010/0265117 A1* | 10/2010 | Weiss | G01S 13/003 342/22 |
| 2011/0050479 A1* | 3/2011 | Mohamadi | G01S 13/89 342/22 |
| 2012/0235849 A1 | 9/2012 | Tatoian et al. | |
| 2013/0107667 A1 | 5/2013 | Boufounos et al. | |
| 2013/0135136 A1* | 5/2013 | Haynes | G01S 13/89 342/22 |

OTHER PUBLICATIONS

L. C. Potter, E. Ertin, J. T. Parker, and M. Cetin, "Sparsity and compressed sensing in radar imaging," Proceedings of the IEEE, vol. 98, No. 6, pp. 1006-1020, Jun. 2010.

D. Malioutov, M. Cetin, and A.S. Willsky, "A sparse signal reconstruction perspective for source localization with sensor arrays," IEEE Transactions on Signal Processing, vol. 53, No. 8, pp. 3010-3022, 2005.

(Continued)

*Primary Examiner* — Peter Bythrow
(74) *Attorney, Agent, or Firm* — Gene Vinokur; Dirk Brinkman

(57) ABSTRACT

A method reconstructs a scene behind a wall by transmitting a signal through the wall into the scene. Parameters of the wall are estimated from a reflected signal. A model of a permittivity of the wall is generated using the parameters, and then the scene is reconstructed as an image from the reflected signal using the model and sparse recovery.

13 Claims, 6 Drawing Sheets

(56) References Cited

OTHER PUBLICATIONS

L. Li and J.L. Krolik, "Vehicular MIMO SAR imaging in multipath environments," in IEEE Radar Conference (Radar), 2011, pp. 989-994.

P.P. Vaidyanathan and P. Pal, "Sparse sensing with co-prime samplers and arrays," IEEE Transactions on Signal Processing, vol. 59, No. 2, pp. 573-586, 2011.

P. Pal and P. P. Vaidyanathan, "Nested arrays: a novel approach to array processing with enhanced degrees of freedom," IEEE Trans. Sig. Proc., vol. 58, No. 8, pp. 4167-4181, Aug. 2010.

T. Blumensath and M. E Davies, "Iterative thresholding for sparse approximations," Journal of Fourier Analysis and Applications, vol. 14, No. 5-6, pp. 629-654, 2008.

F. Soldovieri and R. Solimene, "Through-wall imaging via a linear inverse scattering algorithm," IEEE Geoscience and Remote Sensing Letters, vol. 4, No. 4, pp. 513-517, 2007.

W. Zhang and A. Hoorfar, "Two-dimensional diffraction tomographic algorithm for through-the-wall radar imaging," Progress in Electromagnetics Research B, vol. 31, pp. 205-218, 2011.

P. Protiva, J. Mrkvica, and J. Machac, "Estimation of wall parameters from time-delay-only through-wall radar measurements," IEEE Transactions on Antennas and Propagation, vol. 59, No. 11, pp. 4268-4278, 2011.

\* cited by examiner

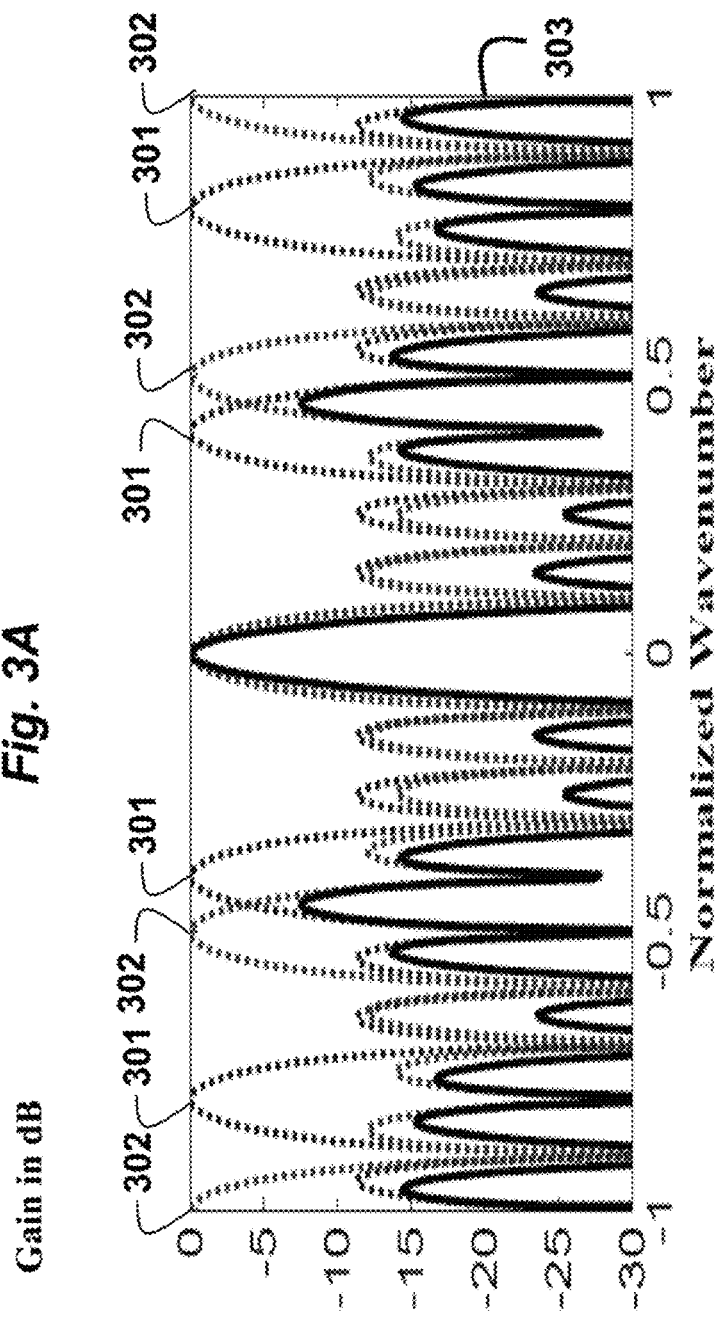

METHOD AND SYSTEM FOR THROUGH-THE-WALL IMAGING USING COMPRESSIVE SENSING AND MIMO ANTENNA ARRAYS

FIELD OF THE INVENTION

This invention relates generally to through-the-wall imaging, and more particularly to using compressive sensing and MIMO antenna arrays to reconstruct a scene behind a wall.

BACKGROUND OF THE INVENTION

Through-the-Wall Imaging

Through-the-wall-imaging (TWI) can be used to detect objects inside an enclosed structure from the outside. In TWI, a transmitter emits an electromagnetic (EM) radar pulse, which propagates through a wall. The pulse is reflected by the objects on the other side of the wall, and then propagates back to a receiver as an impulse response convolved with the emitted pulse. Typically, the transmitter and receiver use an antenna array.

Depending on a dielectric permittivity and permeability of the wall, the received signal is often corrupted with indirect secondary reflections from the all, which result in ghost artifacts in an image that appear as noise. Wall clutter reduction techniques attempt to eliminate the artifacts that arise from the multi-path reflections TWI.

Compressive Sensing

Compressive sensing (CS) and other sub-Nyquist sampling and acquisition methods can be used by sparse, undersampled radar array systems. The antenna array enables radar signal acquisition and imaging using significantly fewer array elements compared to conventional array structures, thus significantly reducing the array implementation cost.

Sparse arrays have an average inter-element spacing much larger than half the wavelength of the transmitted signal, which is the Nyquist interval for may processing. This is achieved using non-uniform element spacing, which eliminates fundamentally unresolvable ambiguities known as grating lobes.

While conventional methods have been used to recover the acquired image, those methods suffer from the increased sidelobes exhibited by those arrays. However, sparse recovery methods are robust to sidelobes, thus enabling imaging using significantly fewer array elements. As used herein, "sparsity" is not a relative term, but rather a term of art used to refer to data with mostly zero values, and only a few non-zero values.

In U.S. application Ser. No. 13/947,426, "Method and System for Through-the-Wall imaging using Sparse inversion for Blind Multi-Path Elimination," filed by Mansour, on Jul. 22, 2013, targets are detected in a scene behind a wall by transmitting a pulse through the wall. A primary impulse response is detected by a sparse regularized least squares inversion applied to received signals corresponding to the reflected pulse. A delay operator that matches the primary impulse response to similar impulse responses in the received, signals is also determined. A distortion of the pulse after the pulse passes through the wall hut before the pulse is reflected by the target can also be determined. The distortion is used in an iterative process to refine the detection of the target and to suppress ghosting artifacts.

SUMMARY OF THE INVENTION

Compressive sensing (CS) and sparse array processing provide new approaches to improve radar imaging systems. The embodiments of the invention uses a Multiple-Input-Multiple-Output (MIMO) radar arrays to significantly reduce the cost and complexity of through-the-wall imaging (TWI).

The embodiments consider nested arrays, co-prime arrays, and random arrays, in the presence of layered lossless walls. Scene reconstruction is performed by formulating and solving a wall parameter estimation problem in conjunction with a sparse reconstruction problem that takes the wall parameters into account.

The MIMO architectures exhibit reduced array gain due to waveform diversity, and provide liner spatial resolution, more degrees of freedom, improved performance in parameter identifiability, as well as multipath rejection.

Under an assumption that an imaged scene is sparse, the description of the method analyzes imaging performance of different sparse array architectures and wall profiles in terms of mainlobe and sidelobe structure by examining characteristics of a point spread function (PSF). The PSF, also known as a beampattern, is intimately related to a mutual coherence in the context of the sparse recovery and compressed sensing. The characteristics of the PSF provide very good intuition on the performance of the array both for sparse reconstruction methods.

Because the increased sidelobe levels of the architectures decrease the performance of conventional imaging methods, a sparse reconstruction is used to exploit the sparsity of the scene of interest. In one embodiment, we apply iterative hard thresholding (IHT). IHT is a greedy-based sparse signal recovery method to estimate the reflectivity map behind the wall.

Furthermore, the embodiments provide an method to estimate the parameters of the all profile from the received data. The profile includes the dielectric permittivity and permeability, and thickness of the wall. These parameters are used to develop imaging operators for our reconstruction method.

BRIEF DESCRIPTION OF THE DRAWINGS

FIG. 3A is a schematic of co-prime arrays are defined by a pair of co-prime numbers according to embodiments of the invention;

FIG. 3B is a schematic of the MIMO array beam pattern for the co-prime array of FIG. 3A according to embodiments of the invention;

DETAILED DESCRIPTION OF THE PREFERRED EMBODIMENTS

System Setup

Figure 1A:
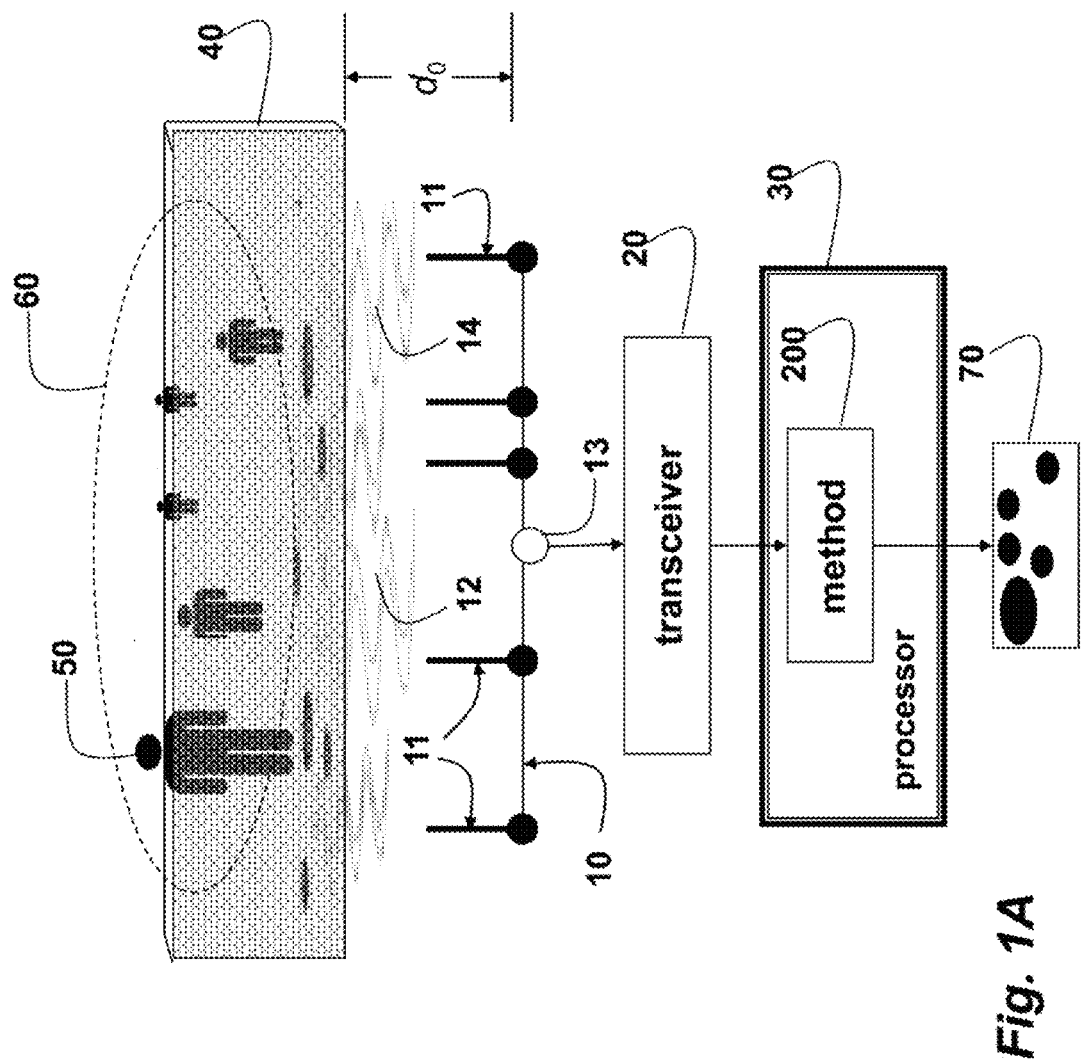
FIGS. 1A and 1B are schematics of a system and method for reconstructing a scene behind a wall according to embodiments of the invention.
Figure 1B:
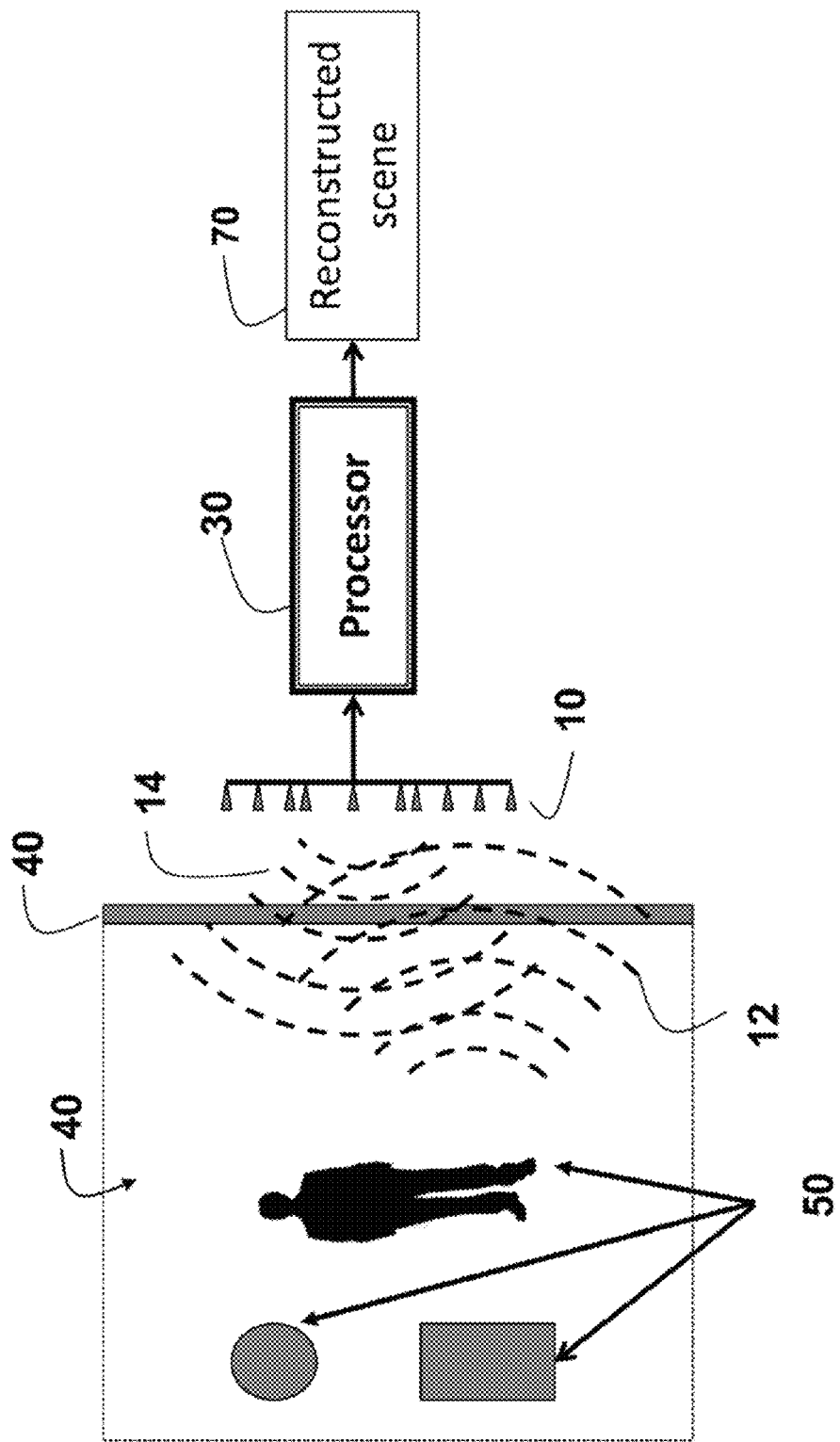

As shown in FIGS. 1A and 1B embodiments of our invention provide a method and system for through-the-wall imaging (TWI) of objects 50 that do not require any prior knowledge of scene geometry. The method can reconstruct a scene 60 behind a wall 40.

The system includes a Multiple-Input-Multiple-Output (MIMO) antenna array 10, transceiver 20, and processor 30. The antenna comprises of multiple elements 11. In the prior art the spacing of the elements is typically uniform and equal to half the wavelength of the transmitted signal. In some embodiments of this invention, an average inter-element spacing of the antenna elements is nonuniform and ranch larger than half the wavelength of the transmitted signal.

The transceiver transmits one or more pulses 14 using some or all of the antenna elements 11 of the antenna array. The transmitted pulse propagates through the wall 40 and are reflected by the possible objects 50 in a scene 60 behind the wall 40. Reflected signals (impulse responses) 12, corresponding to each pulse, are received by elements of the array 10 as described below. The received signals include primary reflections received via direct paths, and indirect secondary reflections received by multi-paths. It is noted, that in some embodiments, an antenna element can be used to only transmit or only receive pulses or both transmit and receive pulses.

The received signals 12 are processed by a method 200 to produce an image 70 that reconstructs the scene 60 including the objects 50. The method can be performed in the processor 30 connected with buses to a memory and input/output interfaces as known in the art.

Figure 1C:
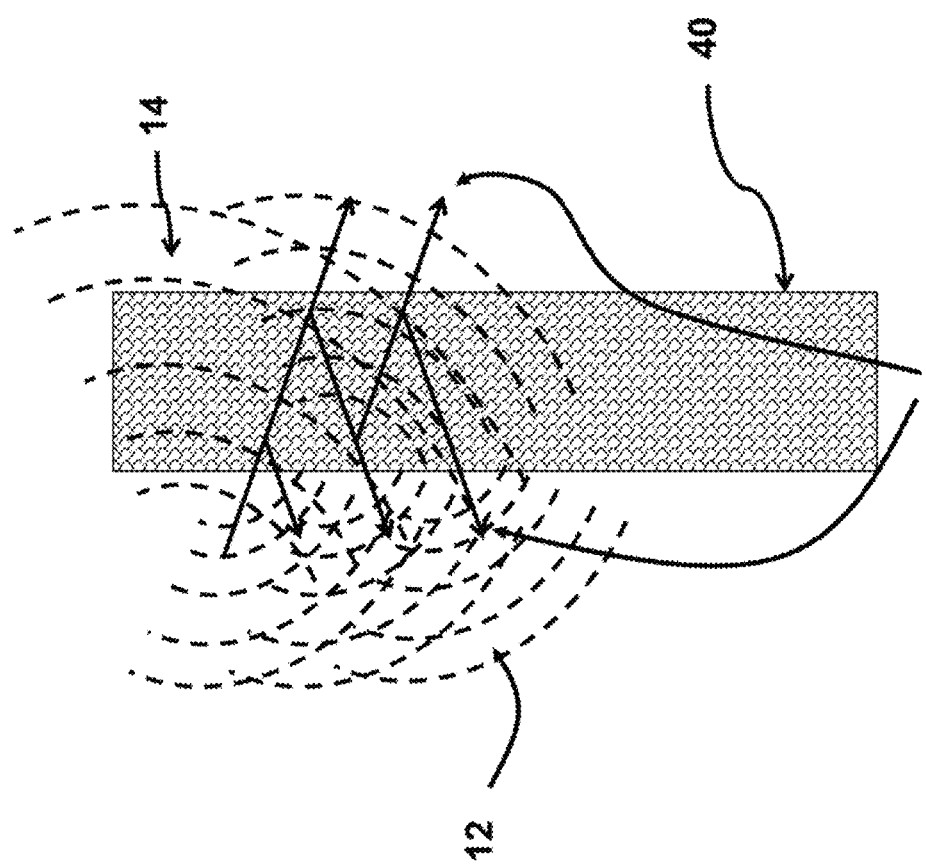
FIG. 1C is a schematic of indirect secondary reflections due to the wall considered by embodiments of the invention.

As shown in FIG. 1C, of particular concern are indirect secondary reflections 80 due to the wall, which can confuse the reconstruction. Therefore, we first estimate parameters of the wall, and use the parameters to build a model of how the scene is reflected through the wall. Then, we use the model to do a sparse recovery of the scene.

Scene Reconstruction

Figure 2:
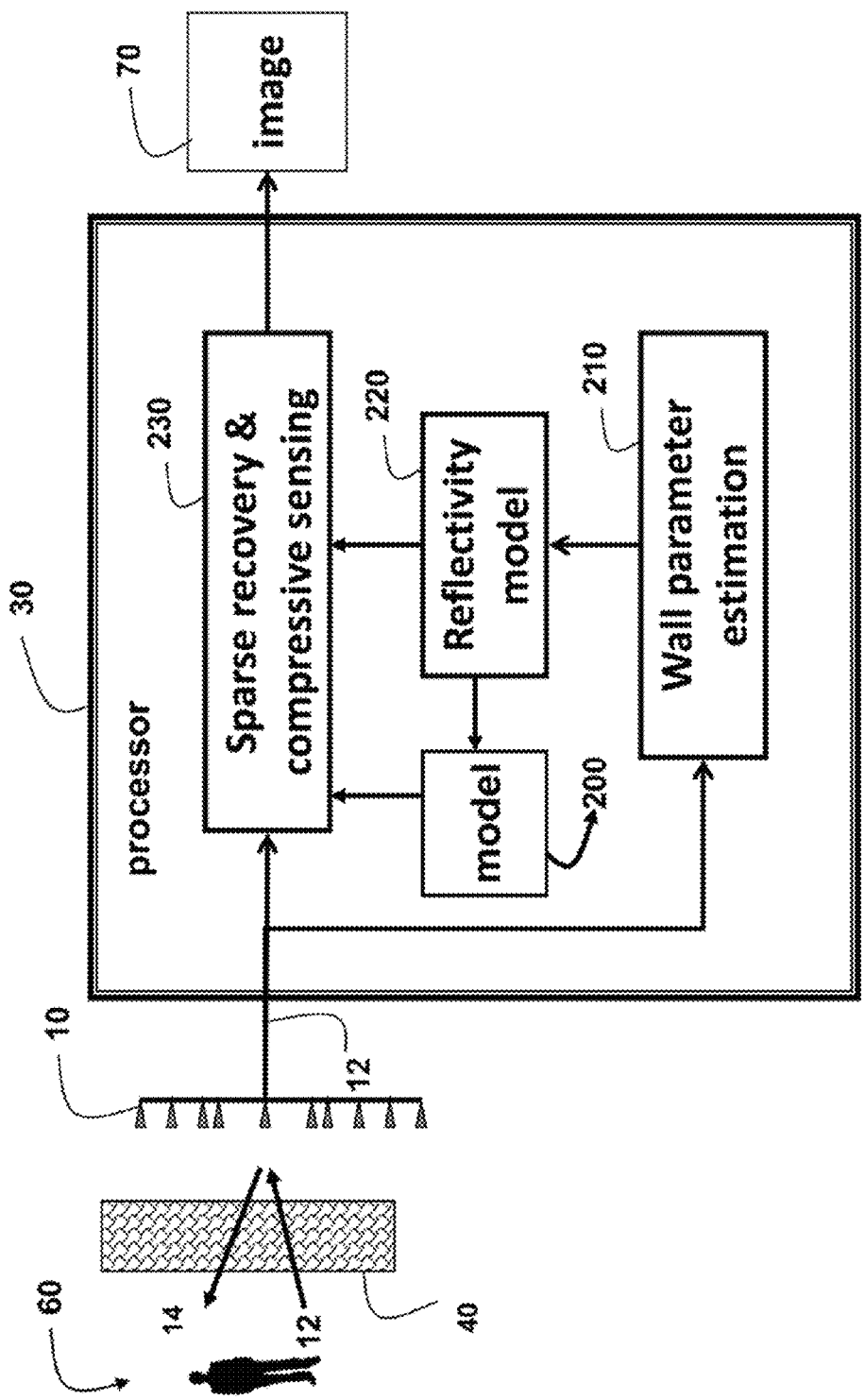
FIG. 2 is a block diagram of the system and method for reconstructing a scene behind a wall according to embodiments of the invention.

As shown in FIG. 2, the scene 60 behind the wall 40 is reconstructed as an image 70 by transmitting the signal 14 through the wall into the scene, and estimating 210 parameters of a dielectric permittivity and permeability of the wall from the reflected signal 12. A model 200 of the wall is generated 220 using the parameters. Then, the scene is reconstructed from the reflected signal using the model, sparse recovery and compressed sensing 230.

TWI Signal Model

We assume a 2D imaging scenario, where the MIMO radar array 10 is located at an origin 13 with a $d_0$ standoff distance from the wall 40. The positions of the $M_t$ transmitter (Tx) and $M_r$ receiver (Rx) elements are $t_i$, $i=1, \ldots, M_t$ and $r_i$, $i=1, \ldots, M_r$, respectively.

Using a point target approximation, a received scattered field, excluding effects of direct wall reflections and additive observation noise, can be written in a frequency domain as $$y(t,r,\omega) \cong \int_S s(p)w(\omega)g(r,p,\omega)g(t,p,\omega)dp. \quad (1)$$

In equation (1), $w(\omega)$ represents a frequency signature of the transmitted radar waveform, $s(p)$ denotes a reflectivity of a the object of interest located at $p=(s,y)$ and S denotes the imaged region 60. The function $g(p_1,p_2,\omega)$ denotes Green's function for a layered medium from point $p_1$ to $p_2$, which is a function of the thickness d, and relative permittivity, $\in$ of the wall. The Greens function is the impulse response of an inhomogeneous differential equation defined on a domain, with specified initial conditions or boundary conditions.

To discretize the system, we partition the region S using a grid of P points, and represent the complex reflectivity of the map using $S \in \tilde{\mathbb{C}}^{(P \times 1)}$. If N frequency samples are obtained at each Rx element, then the discretized version of equation (1) is:

$$y = \Phi s, \quad (2)$$

where $$y = [y(t_1, r_1, \omega_1), y(t_1, r_1, \omega_2), \ldots, y(t_{M_t}, r_{M_r}, \omega_N)]^T, \quad (3)$$

$$\Phi = [\phi_1, \phi_2, \ldots, \phi_P] \in \mathbb{C}^{(M_r M_t N \times P)}, \text{ and} \quad (4)$$

$$\phi_i = \begin{bmatrix} w(\omega_1)g(r_1, p_i, \omega_1)g(t_1, p_i, \omega_1) \\ w(\omega_2)g(r_1, p_i, \omega_2)g(t_1, p_i, \omega_2) \\ \vdots \\ w(\omega_N)g(r_{M_r}, p_i, \omega_N)g(t_{M_t}, p_i, \omega_N) \end{bmatrix}, \quad (5)$$

with $y, \phi_i \in \mathbb{C}^{(M_r M_t N \times 1)}$. The matrix $\Phi$ is also referred to as the array manifold matrix.

Sparse Array Design

Sparse Array Architectures

The Sparse array design in the embodiments starts with a notional grid of $M_r$ and $M_t$ uniformly spaced possible Tx and Rx array elements, respectively. This grid is subsampled according to each architecture, co-prime, nested or random, and only a few grid points are selected to include actual Tx or Rx antenna elements.

As shown in FIG. 3S, co-prime arrays are defined by a pair of co-prime numbers $\tilde{M}_1$ and $\tilde{M}_r$, for Tx and Rx arrays, respectively. The Tx array includes $\tilde{M}_t$ elements with an inter element spacing of $\tilde{M}_r$ grid units, while the Rx array includes $\tilde{M}_r$ elements with an inter-element spacing of $\tilde{M}_t$ grid units.

Figure 4A:
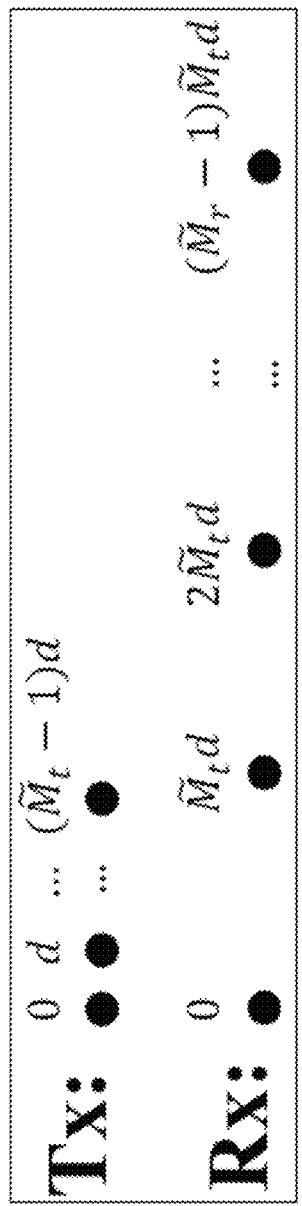
FIG. 4A is a schematic of a nested arrays also includes two uniform linear arrays according to embodiments of the invention.

As shown in FIG. 4A the nested arrays also includes two uniform linear arrays (ULA), where the Tx array includes $\tilde{M}_t$ elements with spacing of one grid unit, and the Rx array includes $\tilde{M}_r$ elements with spacing $\tilde{M}_t$ of units.

Random arrays with the same aperture are designed by random selecting $\tilde{M}_t$ Tx and $\tilde{M}_r$ Rx elements from each grid using a uniform distribution.

The optimal MIMO sparse nested array can be obtained by maximizing the degrees of freedom $\tilde{M}_r \tilde{M}_t$, given the total lumber of MIMO elements $\tilde{M}_r + \tilde{M}_t$. For the co-prime array, an additive prime is also included.

Figure 4B:
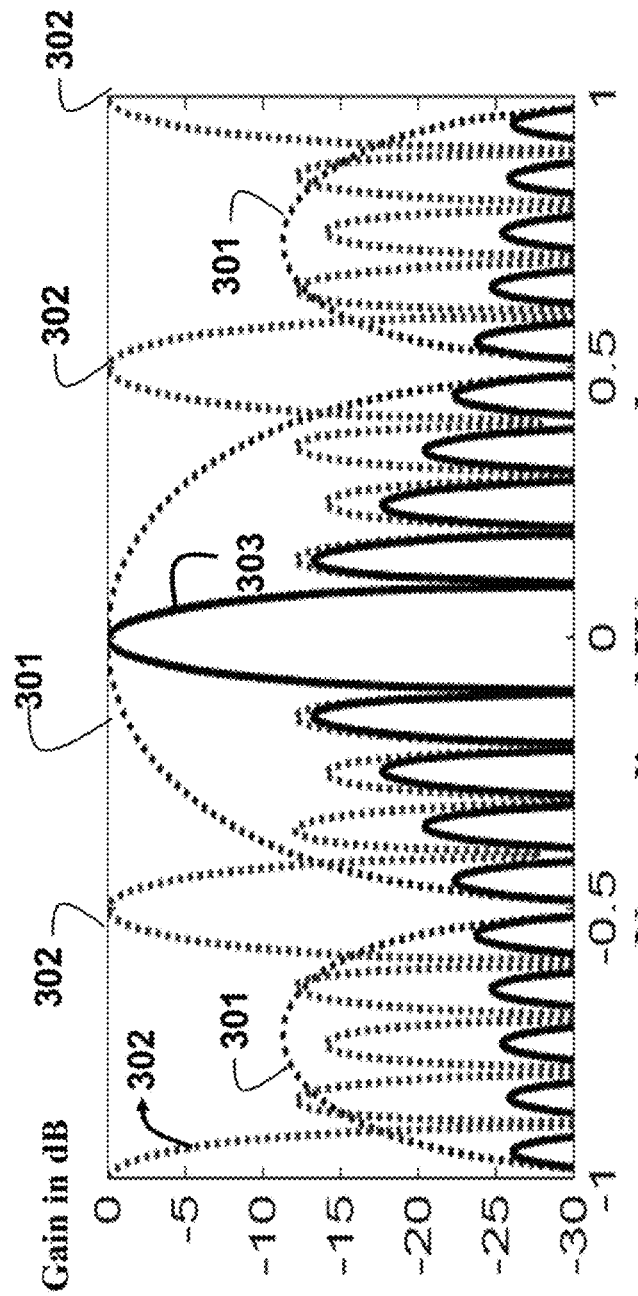
FIG. 4B is a schematic of the MIMO array beam pattern for the nest array of FIG. 4A according to embodiments of the invention.

FIGS. 3B and 4B respectively show examples of MIMO array beam pattern for co-prime array and nested array with $\tilde{M}_r = 4$ and $\tilde{M}_t = 5$. FIGS. 3B and 4B show the beam patterns for the transmitted signal 301, the received signal 302, and the solid line 303 the total product beam patterns.

The $\tilde{M}_r \times \tilde{M}_t$ sparse MIMO array can be considered a subsampling of a $M_r \times M_t$ full MIMO array. This can be represented using a subsampling matrix $D \in \{0,1\}^{\tilde{M}_r \tilde{M}_t N \times M_r M_t N}$. Using $\Phi$ and $\tilde{\Phi}$ to denote the manifold matrices of the full and sparse arrays, respectively, the acquisition function (2) for the sparse array becomes $$\tilde{y} = D\Phi s = \tilde{\Phi} s, \quad (6)$$

where $\tilde{y}$ denotes the subsampled received data.

Array Design Properties

When considering the properties of an array design, conventional array techniques focus on the point spread function (PSF), or beam pattern, of the array. The PSF, appropriately normalized, is equivalent to the mutual coherence between columns of the manifold matrix, a key property of interest in compressive sensing (CS) acquisition systems. The coherence between two columns is defined as the normalized inner product between the columns. The coherence of the matrix is defined as the maximum absolute value of the inner product among all pairs of elements in the matrix.

$$\mu(\tilde{\Phi}) = \max_{i \neq j} \frac{|\tilde{\phi}_j^H \tilde{\phi}_i|}{\|\tilde{\phi}_i\|_2 \|\tilde{\phi}_j\|_2}. \quad (7)$$

A low matrix coherence is sufficient $\mu(\tilde{\Phi})$ but not necessary, to provide worst-case sparse reconstruction guarantees.

On the other hand, the coherence structure described by the PSF, $\tilde{\Phi}^H \tilde{\Phi}_t$, provides significantly more information about the performance of the array, especially under conventional methods, such as the resolution, the noise and interference robustness, and the points in the imaged regions can potentially cause reconstruction ambiguities.

The figures of merit we consider is the mainlobe area (MLA) and the maximum sidelobe level (MSL). The MLA is defined as an area around a point in the scene for which the PSF is above a certain level, typically −3 dB. The MSL is defined as the highest level the PSF reaches in its sidelobes i.e., outside of the main lobe. The MLA is a measure of the resolution of the array, because the MLA represents the ambiguity around a point in the scene. The MSL is a measure of the recoverability of a particular scene point, because it measures the maximum mutual coherence of that point with the other points in the scene.

Scene Reconstruction

Wall Profile Estimation

To determine the Green's function $g(p_1, p_2, \omega)$ in equation (1), we need to determine the permittivity $\in_l$ and the thickness $d_l$, l=1, ..., L, for all L layers in the wall. Because the geometry and reflective characteristics of the wall are not known in advance, the permittivity and thickness is estimated from the data acquired from the received signal 12.

Excluding self-coupling between Tx and Rx array elements, the received signal from all Rx elements includes multipath 60 components from each wall layer. We assume the bistatic Tx and Rx element are separated by $\Delta = \|r - t\|$ but share the same standoff distance $d_0$ from the wall. Using Snell's law, the reflection from the $l^{th}$ layer arrives with delay $\tau_l(\Delta)$, i.e., time of arrival (TOA), is $$\tau_l(\Delta) = \frac{2}{c} \sum_{i=1}^{l} \varepsilon_i r_i \quad (8)$$

with $$\sum_{i=1}^{l} \sqrt{r_i^2 - d_i^2} = \frac{\Delta}{2}, \text{ and} \quad (9)$$

$$\varepsilon_{i-1} \frac{r_{i-1}^2 - d_{i-1}^2}{r_{i-1}^2} = \varepsilon_i \frac{r_i^2 - d_i^2}{r_i^2}, i = 2, \ldots, l, \quad (10)$$

where the $r_i$ is the one-way traveling distance within each layer.

Thus, the unknown wall parameters, collectively denoted using $\theta = \{\in_l, \ldots, \in_L, d_l, \ldots, d_L\}$, can be obtained by minimizing a mean squared error between the measured TOA of each reflection, $\tau_l(\Delta)$, l=1, ... L and the predicted TOA $\hat{\tau}_l(\Delta, \theta)$, given the wall parameters from each layer:

$$\theta = \operatorname*{argmin}_{\theta} \sum_{l=1}^{L} \sum_{j=1}^{\tilde{M}_t \tilde{M}_r} \alpha_j |\tau_l(\Delta_j) - \hat{\tau} l(\Delta_j, \theta)|^2, \quad (11)$$

where $\alpha_j$ is the weight assigned to each Tx–Rx separation and $\tilde{M}_t, \tilde{M}_r$ is the total number of Tx–Rx separations from the MIMO radar array. For limited RF bandwidth or low SNR applications, super-resolution or adaptive techniques can be applied to obtain more accurate TOA estimates.

Sparse image Recovery

To recover the scene reflectivity $\hat{s}$ from the measurements $\tilde{y}$ in equation (6), we assume that the scene is sparse and use CS techniques.

Specifically, one embodiment may solve the sparsity constrained minimization problem $$\hat{s} = \operatorname*{argmin}_{s} \|\tilde{y} - \tilde{\Phi}s\|_2^2 \text{ s.t. } \|s\|_0 \leq K, \quad (12)$$

where K is the maximum sparsity of s, i.e., the maximum number of reflectors in the discretized scene. While in general the problem is NP-hard, it can be solved by relaxing the $l_0$ norm to its $l_1$ convex hull or using a greedy methods. One embodiment can use iterative hard-thresholding (IHT), which is an iterative method in which the sparse estimate $\hat{s}_\Omega^{(t+1)}$ at iteration t is estimated using $$\hat{s}_\Omega^{(t+1)} = \tau_K(\hat{s}_\Omega^{(t)} + \eta \tilde{\Phi}^H (\tilde{y} - \tilde{\Phi} \hat{s}^{(t)})), \quad (13)$$

where $\eta$ is a step size, and $\tau_K(\bullet)$ is a hard thresholding operator that preserves only the K largest magnitude components of its argument and sets the remaining components to 0. The IHT is the preferred embodiment because it provides a great balance of computational cost and recovery performance compared to alternatives. It also allows for greater adaptability to signal models using model-based CS. The IHT can be further accelerated by adapting the step-size selection in each iteration. Other embodiments may use other methods to solve equation (12), such as the matching pursuit (MP), the orthogonal matching pursuit (OMP), the subspace pursuit (SP), the Compressive Sampling Matching Pursuit (CoSaMP) and approximate message passing (AMP), see e.g., U.S. Pat. No. 7,834,795.

Another embodiment may use a convex optimization approach, which attempts to approximate:

$$\hat{s} = \operatorname*{argmin}_{s} \|s\|_0 \text{ s.t. } \|\tilde{y} - \tilde{\Phi}s\|_2 \approx 0. \quad (14)$$

As with the embodiments above, the problem is NP-hard, and it can be solved by relaxing the $l_0$ norm to its $l_1$ convex hull. The methods that approximate or solve (14) may use one of the following formulations, among others:

$$\hat{s} = \operatorname*{argmin}_{s} \|s\|_1 \text{ s.t. } \|\tilde{y} - \tilde{\Phi}s\|_2 \leq \epsilon, \quad (15)$$

and $$\hat{s} = \operatorname*{argmin}_{s} \|s\|_1 + \lambda \|\tilde{y} - \tilde{\Phi}s\|_2^2. \quad (16)$$

These formulations may be solved using a number of methods, such as the iterative soft thresholding algorithm (ISTA), fixed point continuation (FPC), gradient projection for sparse reconstruction (GPSR), smoothing proximal gradient (SPG), among others, see U.S. Pat. No. 7,834,795.

Evaluation of Array Designs

From our experimental evaluation of our antenna designs, we draw the following conclusions. Co-prime arrays have a better cross-range resolution (as measured by the MLA) than nested arrays because co-prime arrays provide larger MIMO virtual aperture length. On the other hand, nested arrays, exhibit lower MSL. Random arrays in general produce higher MSLs compared to co-prime and nested arrays. The effect of array geometry on MSL is significantly diminished for walls with higher relative permittivity; overall, MSL increases as relative permittivity increases. For smaller wall permittivity, multiple reflections can cause ambiguities in the range profile resulting in enlarged MLAs. For larger wall permittivity, multiple reflections produce better range resolvability with lower MLA but larger MSL. v) Points of interest near the endfire array surfer more serious influence from wall multiples, because the Fresnel reflection coefficient of the air-wall interface increases.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for reconstructing a scene behind a wall, comprising:
   an antenna array configured for transmitting a signal through the wall into the scene;
   a processor configured for estimating parameters of the wall from a reflected signal, and generating a model of the permittivity of the wall using the parameters, and reconstructing the scene as an image from the reflected signal using the model, sparse recovery and compressed sensing.

2. The system of claim 1, further comprising:
   a Multiple-Input-Multiple-Output (MIMO) antenna array to transmit and receive the signals.

3. The system of claim 2, wherein an average inter-element spacing of antenna elements of the array is nonuniform and much larger than half a wavelength of the transmitted signal.

4. The system of claim 2, wherein the array is a co-prime array.

5. The system of claim 2, wherein the array is a nested array.

6. The system of claim 2, wherein the array is a random array.

7. The system of claim 1, wherein the parameters include a permittivity and a thickness for all layers in the wall.

8. The system of claim 1, wherein the parameters are obtained by minimizing a mean squared error between a measured time of arrival (TOA) and a predicted TOA of the received signal.

9. The system of claim 1, wherein the sparse recovery uses a greedy sparse recovery method.

10. The system of claim 9, wherein the greedy sparse recovery method uses an iterative hard-thresholding algorithm (IHT).

11. The system of claim 9, wherein the greedy sparse recovery method is accelerated by adapting a step-size selection in each iteration.

12. The system of claim 1, wherein the sparse recovery uses a convex sparse approximation method.

13. The system of claim 12, wherein the convex sparse approximation method is accelerated by adapting a step-size selection in each iteration.

* * * * *